United States Patent [19]
Makishima

[11] Patent Number: 5,644,713
[45] Date of Patent: Jul. 1, 1997

[54] METHOD OF EFFECTING DYNAMIC MANAGEMENT OF PATH OR ROUTING INFORMATION WITHOUT REQUIRING AN INTERNETWORKING OPERATION FOR ROUTING

[75] Inventor: Tomonori Makishima, Hiratsuka, Japan

[73] Assignee: The Furukawa Electric Co., Ltd., Tokyo, Japan

[21] Appl. No.: 432,654

[22] Filed: May 2, 1995

[30] Foreign Application Priority Data

May 12, 1994 [JP] Japan ................................. 6-098491

[51] Int. Cl.⁶ ................................. G06F 15/16
[52] U.S. Cl. ................. 395/200.01; 395/200.15; 395/800; 364/DIG. 1; 364/DIG. 2; 379/273
[58] Field of Search ..................... 395/800, 600, 395/200.16, 200.15, 311, 200.01, 200.11, 200.18, 200.12, 500, 612; 370/60, 94.1; 379/265, 273, 59; 364/DIG. 1, DIG. 2; 358/402, 407

[56] References Cited

U.S. PATENT DOCUMENTS

| | | | |
|---|---|---|---|
| 3,787,632 | 1/1974 | Male et al. ............................ | 379/115 |
| 4,623,964 | 11/1986 | Getz et al. ............................ | 395/650 |
| 5,042,062 | 8/1991 | Lee et al. ............................ | 379/59 |
| 5,317,631 | 5/1994 | Chen ............................ | 379/164 |

*Primary Examiner*—Daniel H. Pan
*Attorney, Agent, or Firm*—Frishauf, Holtz, Goodman, Langer & Chick

[57] ABSTRACT

In a method for transferring path information of an internetworking equipment (router), the router is connected to an alternative router or routers by means of a circuit of an ISDN, whereby routing information between networks is communicated. When activated, the first router is connected to a circuit in response to a request for routing information transmission, and transmits all pieces of routing information to the alternative router(s). When it is connected to the circuit in response to a request for some other transmission than the routing information transmission, the first router exchanges the routing information with the alternative router (s). When the routing information is changed, the first router is connected to the circuit in response to a request for routing information transmission, and transmits the routing information to the other router(s) without executing periodical updating.

18 Claims, 4 Drawing Sheets

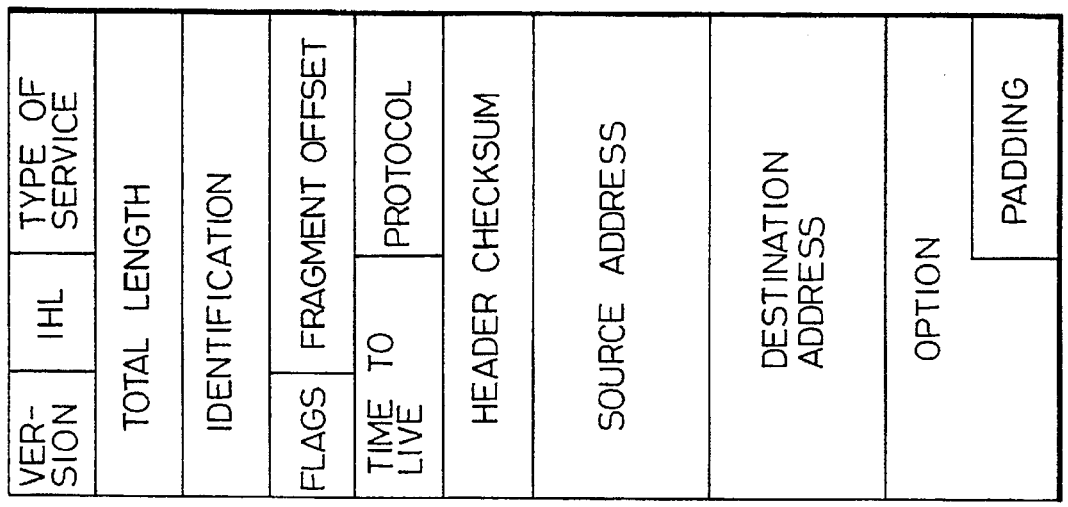
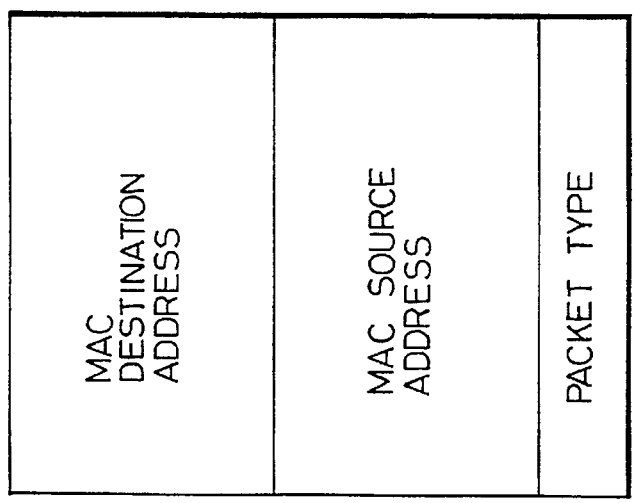

FIG. 5

| UDP SOURCE PORT |
|---|
| UDP DESTINATION PORT |
| UDP MESSAGE LENGTH |
| UDP CHECKSUM |

FIG. 6

| COMMAND | VERSION |
|---|---|
| MUST-BE-ZERO FIELD ||
| ADDRESS-FAMILY IDENTIFIER ||
| MUST-BE-ZERO FIELD ||
| IP ADDRESS ||
| MUST-BE-ZERO FIELD ||
| MUST-BE-ZERO FIELD ||
| METRIC ||

METHOD OF EFFECTING DYNAMIC MANAGEMENT OF PATH OR ROUTING INFORMATION WITHOUT REQUIRING AN INTERNETWORKING OPERATION FOR ROUTING

BACKGROUND OF THE INVENTION

1. Field of the Invention

The present invention relates to a method for transferring path or routing information of internetworking equipment, such as a router, brouter (which serves both as a bridge and a router), etc., which is connected to communication circuits and communicates path or routing information between networks. Throughout the following description and claims, the terms "path" and "routing" are used interchangeably.

2. Description of the Related Art

Conventionally, internetworking equipment (e.g., routers) of this type are connected to communication circuits, such as public networks, ISDNs (integrated services digital networks), etc. In order to enable data communication between the networks, the routers carry out propagation and control of path information (routing information) in the networks. Protocols for the propagation of the routing information include dynamic routing protocols, such as an RIP (routing information protocol). The routers request periodical transmission of all pieces of routing information according to the RIP, to thereby exchange the routing information between the networks.

This routing method requires a function (hereinafter referred to as "periodical update function") to make a simple path calculation from information for routers to execute a gateway operation for data next and from metric information indicative of the number of the routers (including a local one) and transmit all pieces of routing information periodically (e.g., once in 30 seconds), and a function (hereinafter referred to as "age-out function") to erase the router information and metric information when there is no data input for a predetermined period of time. Besides the periodical update function, the routing method covers a function (hereinafter referred to as "triggered update function") to transmit only changed routing information, if any, immediately.

With use of the RIP, according to the routing information method described above, all pieces of routing information need not be set statically, so that change of the routing information attributable to disconnection of the path can be automatically tackled with speed. In some cases, the routers based on this routing method may carry out routing by utilizing a timer-charged circuit, such as an ISDN. Preferably, in these cases, the connection time for the circuit should be minimized so that the circuit can be internetworked only when necessary.

When periodical updating is carried out, the circuit is frequently internetworked for periodical transmission, and sometimes may be left internetworked. In the case where the routing is effected with use of the timer-charged ISDN, therefore, a method is conventionally used such that the routing information is statically set to ensure practical costs.

In general, the routing information can be set statically in a very simple network arrangement (including one or two networks). In the least intricate network arrangement (including three or more networks), however, the routing information cannot be easily set without good knowledge of networks.

Conventionally, therefore, routing protocols are not expected to use the periodical update function. In this case, the purpose of application requires the circuit to be disconnected when there is no communication, and information is held without time-out control. Further, the routing protocols are bound to be worked only in specific circuits between specific routers.

According to this routing method, however, the information can be transmitted only a specific number of times, so that it is expected to be delivered correctly to destination routers without fail during the transmission. Once the information is subjected to mismatching, moreover, it cannot be restored with ease, so that the utmost care should be taken to avoid such mismatching. In case of mismatching, furthermore, the information must be able to be restored.

When the routing information is changed, triggered updating is normally effected such that the information is transmitted immediately. In the case of an interface which has no broadcast function (broadcast-type general message receiving function), e.g., an interface such that the partners of internetworking are changed by the source of transmission using an ISDN, however, a triggered update is transmitted to all the partners, so that the routers are subjected to a substantial load. In the case where the number of partners of transmission is large, in particular, the load on the routers is a great problem.

SUMMARY OF THE INVENTION

The present invention has been contrived in consideration of these circumstances, and an object of the invention is to provide a method for transferring path information of internetworking equipment which, using a general timer-charged circuit, can effect dynamic management of path information, which entails reduced costs, and which facilitates network management.

Another object of the invention is to lengthen the intervals of periodical transmission to networks for a periodical updating operation, or to omit the periodical updating operation itself.

Still another object of the invention is to minimize mismatching of path information.

A further object of the invention is to enable efficient exchange of information despite change, if any, of path information, thereby improving the reliability of the path information.

The above objects are achieved by a method for transferring path information of internetworking equipment according to the present invention. In this method, a first internetworking equipment is connected to at least one alternative internetworking equipment, such as a router, by means of a circuit, such as an ISDN, and path information (routing information) is communicated between networks. In the case where the ISDN is internetworked in response to a request for some other transmission than the transmission of the routing information, the routing information is exchanged with the alternative router in an exchange process. Thus, according to the method for transferring path information of the invention, intervals for periodical updating operation can be lengthened or the periodical updating operation can be omitted by repeating the exchange of routing information with the alternative router a plurality of times when the ISDN is internetworked.

Preferably, the path information transferring method comprises a start transmission process for transmitting all pieces of routing information to the alternative router in a manner such that the ISDN is internetworked in response to a request for the transmission of the routing information at the time of activation of the first router. The first internetworking equipment transmits all pieces of routing information a plurality of times at the time of activation. Thus, the routing information can be transmitted to all transmittable networks from the start of operation without requiring initialization of the routing information, so that mismatching of the routing information can be minimized.

Preferably, moreover, the path information transferring method comprises a modified transmission process for transmitting the routing information to the alternative router in a manner such that the ISDN is internetworked in response to a request for the transmission of the routing information when the routing information is changed. When the routing information is changed, the first internetworking equipment transmits the routing information to the alternative router a plurality of times, thereby improving the reliability of the routing information,

BRIEF DESCRIPTION OF THE DRAWINGS

FIG. 3 is a diagram showing an arrangement of an Ethernet header used according to the invention;

FIG. 4 is a diagram showing an arrangement of an IP header;

FIG. 5 is a diagram showing an arrangement of a UDP header; and

FIG. 6 is a diagram showing an arrangement of application data.

DESCRIPTION OF THE PREFERRED EMBODIMENTS

A path information transferring method according to the present invention will now be described with reference to the accompanying drawings of FIGS. 1 to 6.

Figure 1:
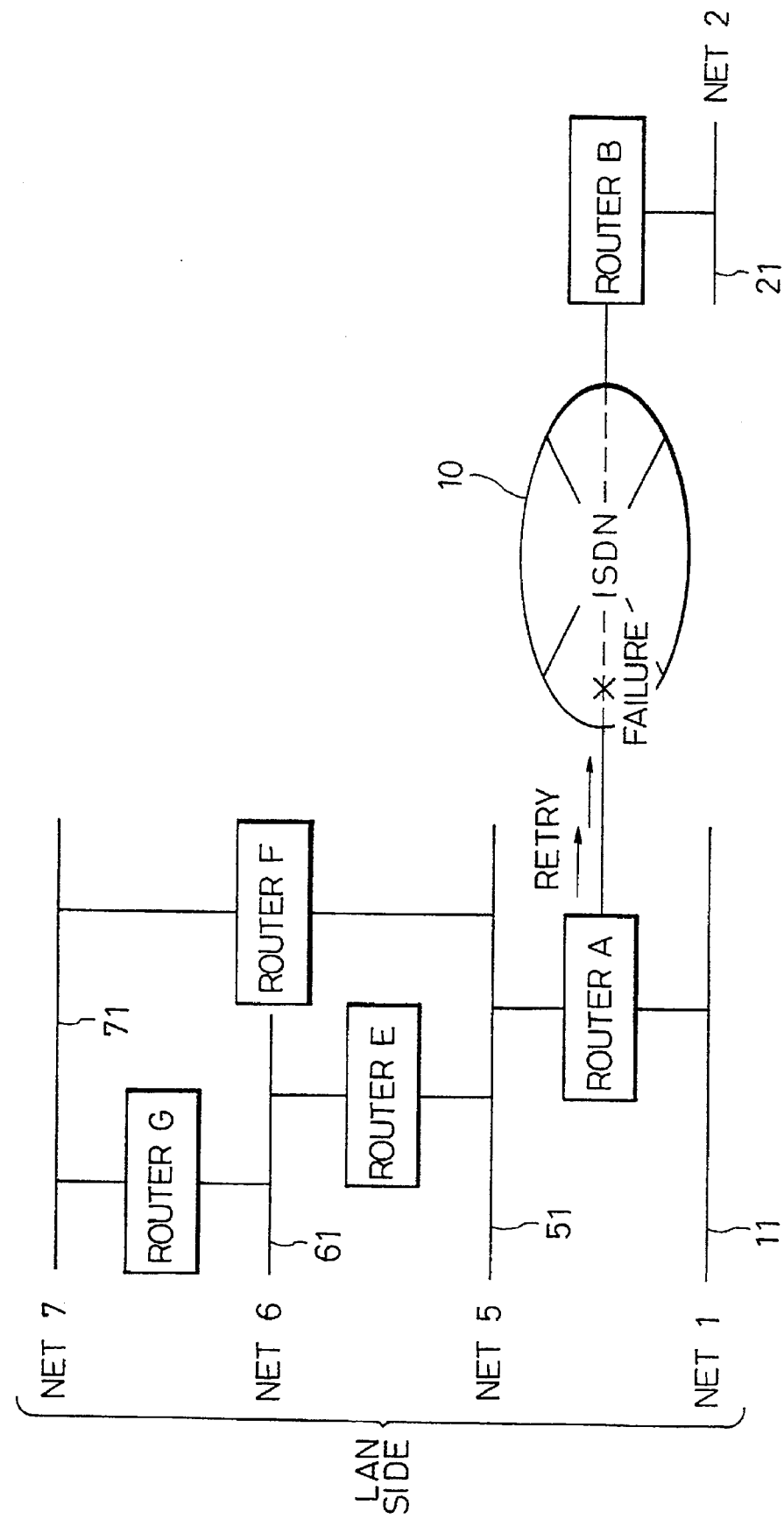
FIG. 1 is a diagram showing one embodiment of a WAN based on a path information transferring method according to the present invention.
Figure 2:
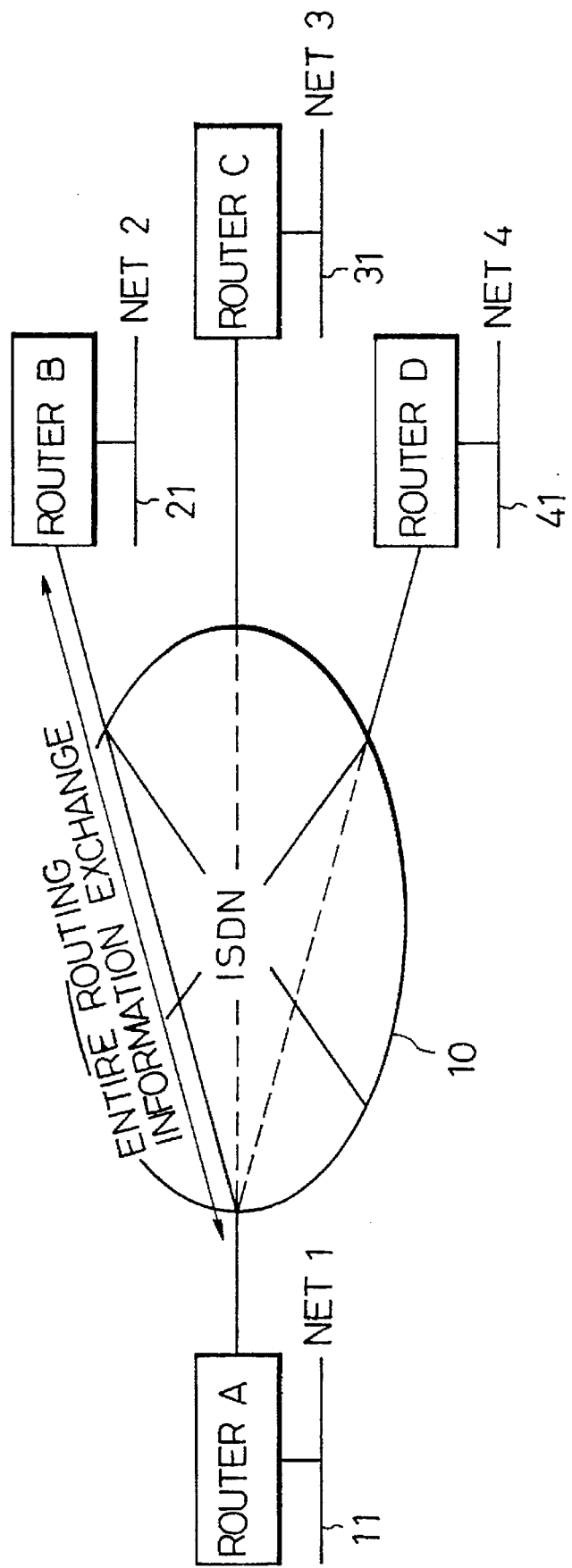
FIG. 2 is a diagram showing another embodiment of the WAN based on the path information transferring method.

FIGS. 1 and 2 are diagrams showing embodiments of a WAN (wide area network) based on a path information transferring method according to the present invention. FIG. 1 shows a case in which internetworking equipment (hereinafter referred to as "routers") having functions of routers are connected in one-for-one relation by means of an ISDN. FIG. 2 shows a case in which alternative routers having the same functions as the routers shown in FIG. 1 are connected in one-for-others relation by means of an ISDN.

Referring to FIGS. 1 and 2, a network 1 is composed of a router A and a transmission line 11 to which the router A is connected. A network 2 is composed of a router B and a transmission line 21 to which the router B is connected. A network 3 is composed of a router C and a transmission line 31 to which the router C is connected. A network 4 is composed of a router D and a transmission line 41 to which the router D is connected. A network 5 is composed of routers A, E and F and a transmission line 51 to which the routers A, E and F are connected. A network 6 is composed of routers E and G and a transmission line 61 to which the routers E and G are connected. Further, a network 7 is composed of routers F and G and a transmission line 71 to which the routers F and G are connected. The networks 1, 5, 6 and 7 constitute a LAN. The arrangement shown in FIG. 2, like the one shown in FIG. 1, also includes the networks 5 to 7 which, in conjunction with the network 1, constitute a LAN. For simplicity of illustration, however, this LAN is omitted in FIG. 2.

The router A stores routing information for data transmission. The router A has a periodical update function of periodically transmitting all routing information to the other routers E to G connected thereto by the transmission lines, according to the RIP as conventionally known, as well as an age-out function of erasing router information and metric information in the absence of data input for a predetermined period of time. Further, the router A has a triggered update function, in addition to the periodical update function, to immediately transmit only modified information when the information is modified. Using these functions, the router A exchanges routing information between the networks.

In exchanging the routing information between the networks with the router(s) (router B of FIG. 1 or routers B, C and D of FIG. 2) connected by means of the ISDN, the router A abolishes periodical transmission based on periodical updating and age-out. Instead, the router A starts to internetwork an ISDN circuit 10 at the time of activation. When this circuit is internetworked, the router A exchanges all pieces of routing information (start transmission process). Unless the routing information is changed (changing transmission process) thereafter, the router A does not perform internetworking operation for routing information exchange.

This is because initially internetworking the circuit by communication traffic requires routing information for internetworking. Once the ISDN circuit 10 is internetworked, a router can learn all exchangeable pieces of routing information at this point of time, so that the setup volume of the routing information may be minimized. However, the internetworking operation itself can be accomplished only if destination addresses (telephone number, etc.) in an exchange circuit are immediate addresses, and requires no routing information. Thus, the routers B to D can obtain all acquirable pieces of routing information, and can automatically learn and acquire necessary routing information without statically setting the routing information in advance.

In this case, there is a possibility that there exists a partner or destination router that has not yet been activated. In order to cut extra traffic, therefore, the router A is expected to retry routing information transmission a plurality of times, e.g., three times.

In order to transfer data to a desired network, moreover, the router A statically sets information (initial value of routing information) indicative of the router to which the data should be delivered. Then, the router A can perform one cycle of an internetworking operation for each of the routers B to D which are connected thereto by means of the ISDN circuit 10 at the time of activation, thereby transmitting all pieces of routing information to the individual routers B to D. Thus, according to the present embodiment, there is neither an internetworking operation for routing information exchange at the time of activation, nor any influence on other communications attributable to occupation of circuits, nor fee charging.

The routing information is composed of an RIP packet based on headers and application data shown in FIGS. 3 to 6, for example. The headers and the application data are transmitted to a destination router in the order named. The packet is transmitted in bytes (each composed of eight bits) onto each network, and the order of transmission for each byte depends on the physical medium (Ethernet, public packet network, or token ring).

In the case of a packet on an Ethernet, for example, an Ethernet header shown in FIG. 3 is transmitted first. The Ethernet header is composed of, for example, an MAC (medium access control) destination address and MAC source address, in six bytes each, and packet-type information in two bytes. In the case of an RIP packet, its destination is a broadcast (broadcast-type general message reception), and information indicative of an IP (internet protocol) packet type is transmitted.

FIG. 4 is a diagram showing an arrangement of an IP header. The IP header is composed of, for example, a version and IHL (internet header length), in four bits each, type of service in one byte, total length and identification, in two bytes each, flags in four bits, fragment offset in twelve bits, time to live and protocol, in one byte each, header checksum in two bytes, source address and destination address, in four bytes each, option in three bytes, and padding information in one byte. Normally, in the case of the RIP packet, the destination address is formed of information which is indicative of a broadcast.

FIG. 5 shows an arrangement of a UDP (user datagram protocol) header. This UDP header is composed of, for example, a UDP source port, UDP destination port, UDP message length, and UDP checksum, in four bytes each. The destination port is a local address at the destination, which normally is settled when an application for communication is activated. Although the UDP is used in this RIP, a TCP (transmission control protocol), such as a Telnet or FTP (file transfer protocol), may be used in some applications.

FIG. 6 is a diagram showing an arrangement of application data. Data in this diagram include, for example, a command and version, in one byte each, must-be-zero field and address-family identifier, in two bytes each, and IP address, must-be-zero field, and metric information, in four bytes each. In these data, the information for the last 16 bytes (from IP address to metric) is repeated for the number of entries. The maximum entry number is 25. If this number is exceeded, the data are divided and transmitted in separate packets.

Further, the router A monitors the ISDN circuit 10 by utilizing its traffic monitoring function, and disconnects the circuit by a traffic for a predetermined period. When the circuit 10 is internetworked in response to a request for some other communication than the transmission of routing information, thereafter, the router A exchanges all pieces of routing information again with the router B (exchange process). This routing information exchange may be carried out in the following two communication methods.

In a first method, the router A is previously stored with a variation (modified routing information) from the preceding routing information by the exchange, and transmits only this modified routing information to the destination router B. In this case, the volume of exchanged information can be minimized. Structurally, however, the destination router B must be stored in advance with all alternate routes that are selectable, this technique is effective when the storage capacity of the router is large enough.

In a second method, the router A is previously stored with all pieces of routing information, and transmits the information to the destination router B. In this case, the router A must only be stored with an optimum path (e.g., shortest path), so that its necessary storage capacity can be reduced considerably.

Table 1 shows an example of routing information set in the router A of FIG. 1.

TABLE 1

| Network Address | Metric Information | Gateway Information |
| --- | --- | --- |
| Network 1 | 1 | — |
| Network 2 | 2 | Router B |
| Network 5 | 1 | — |
| Network 6 | 2 | Router E |
| Network 7 | 2 | Router F |

Routing information set in the router A of FIG. 2 is obtained by adding information of networks 3 and 4 to the routing information of Table 1. The network address is an address which is set in advance for each network. The metric information is a number indicative of the distance to the destination, that is, the number of routers which relays the data to the destination. The router A is included in this number of routers. The gateway information is information for the first router on the route to the destination.

To attain the effect of the aforesaid second method, however, detecting means is needed to detect disappearance, if any, of necessary routing information for data communication. According to the present invention, therefore, there are provided the following three detecting mechanisms.

(1) First detecting mechanism: If there is any routing information which, among all other pieces of routing information, has disappeared after the transmission of the preceding routing information, information indicative of the disappearance of the routing information is held. In replacing all pieces of routing information, the information indicative of the disappearance of the routing information, along with other pieces of routing information, is transmitted to another router as a partner of exchange. In the routing information shown in Table 1, the disappearance of the routing information is indicated by adjusting the metric information to 16, for example.

(2) Second detecting mechanism: Immediately after the circuit is internetworked, previously learned routing information is detected from another router as a partner of exchange, and a desired age-out time is set only for the detected routing information. The mechanism is designed so that the routing information disappears after the passage of this set time (age-out time). This age-out function resembles the age-out function of the ordinary RIP protocol, although the set time is shortened considerably. After the circuit is internetworked, the age-out function is suspended for the routing information lately received from the alternative router, and the routing information is held without executing time-out control.

(3) Third detecting mechanism: When the exchange of the routing information with the other router is finished, the mechanism delivers a signal indicative of an end of transmission to the routers, and compares the exchanged routing information with the routing information previously learned from the same router, thereby detecting the erased routing information.

If the routing information is changed, according to the present embodiment, moreover, the router A uses its triggered update function to perform internetworking operation for routing information exchange with the destination router (modified transmission process). As in the case of the aforesaid exchange process, communication methods for this case include a method in which changed pieces of routing information are transmitted and a method in which all pieces of routing information are transmitted. The three detecting mechanisms described above can be provided according to this second method.

The following is a description of a routing information transmitting operation for the one-for-one arrangement shown in FIG. 1. In the present embodiment, the router A is previously stored with all pieces of routing information, and transmits the information to the router B. According to this embodiment, moreover, only the routers A and B which are connected by means of the ISDN circuit 10 are operated without effecting the periodical updating, while the periodical updating is effected as usual on the LAN side.

When the router A is first activated by turning the power on, an internetworking operation for the ISDN circuit 10 is started. When the circuit 10 fails to be internetworked, the internetworking operation is retried a plurality of times.

When the circuit 10 is then internetworked, transmission of all pieces of routing information to the router B is repeated a plurality of times. Thereupon, the router A is enabled to exchange all pieces of routing information with the router B (start transmission process). Unless the routing information is changed, thereafter, the internetworking operation for routing information exchange is not carried out. Then, the router A disconnects the circuit 10 if its traffic monitoring function detects no traffic for a predetermined period of time.

When the circuit 10 is internetworked in response to a request for some other communication than the one for the exchange of routing information, e.g., a request for communication data trunking, after the circuit is disconnected, the router A internetworks the circuit and transmits all pieces of routing information to the router B a plurality of times, whereby it is enabled to exchange routing information with the router B (exchange process).

Also if the routing information is changed, the router A internetworks the circuit by its triggered update function, and repeats transmission of all pieces of routing information to the router B a plurality of times. Thereupon, the router A is enabled to exchange routing information with the router B (changing transmission process).

The router B extracts information for routers to execute gateway operation for data next and metric information indicative of the number of the routers from the routing information inputted through the ISDN circuit 10, and makes a simple route calculation from these pieces of information. Based on the result of this calculation, the router B can learn for route change and carry out a single-office routing information modification.

Thus, in the present embodiment, the packet routing information is initially transmitted a plurality of times, and the internetworking operation for routing information exchange is not carried out thereafter unless the routing information is changed. According to this embodiment, therefore, mismatching of the routing information can be minimized by executing a minimum routing information exchange.

According to this embodiment, moreover, all pieces of routing information are communicated after the circuit once disconnected is internetworked again. Therefore, the reliability of routing information can be improved, and the change of a partner of internetworking can be tackled without requiring an internetworking operation for information exchange. Thus, the operating efficiency can be improved.

Although the case in which the periodical updating is not effected has been described in connection with this embodiment, the present invention is not limited to this case, and may be also applied to a case in which the periodical updating is expected. In this case, intervals for the periodical updating can be made longer enough than those for the conventional periodical updating. According to this embodiment, therefore, the circuit can be prevented from being left internetworked.

The following is a description of routing information transmitting operation for the one-for-others arrangement shown in FIG. 2. In the present embodiment, the routers A and B which are connected by means of the ISDN circuit 10 are operated without effecting the periodical or triggered updating. According to this embodiment, moreover, only router information (initial value of routing information) for the shortest route to the network for static communication is set beforehand in the router A without making a request for communication at the time of activation of the power supply.

When the circuit is internetworked in response to a request for some other communication than the one for the exchange of routing information, the router A exchanges all pieces of routing information with the destination router (router B, C or D) (exchange process). Thereupon, the routing information is transferred from the router A to the network on the destination or partner side, and the learned routing information enables data communication between the networks.

If the communication partner is changed, the router A finds the information therein previously learned from the partner router which is to serve as an internetworking router. After erasing the information, the router A exchanges routing information again with the partner of internetworking.

Thus, according to this embodiment, data communication by means of a plurality of routers can be carried out in a manner such that the routers only set the minimum routing information by using one physical and logical interface.

In this embodiment, neither periodical update transmission nor triggered update transmission is performed, and the routing information is exchanged when other packets are to be transmitted. Accordingly, information can be exchanged efficiently in a manner such that the circuit working time for routing information exchange is minimized.

According to the present embodiment, moreover, no internetworking is effected independently for routing information exchange. Thus, the interface, which has no broadcast function, can enjoy a large number of partners for transmission and efficiently transfer routing information to these partners.

Besides, according to this embodiment, an arrangement may be provided such that the routers can have a plurality of logical interfaces for one physical interface. In this case, the routing information is exchanged by making connection to the routers B to D, once for each, when the power supply is started. Thus, one-for-others data communication and communications with a large number of other networks which are connectable by means of the routers can be carried out without initializing static routing information.

In this embodiment, as in the case of the aforementioned one-for-one arrangement, long-interval periodical and triggered update functions can be used in combination.

The path information transferring method according to the present invention comprises the start transmission process, exchange process, and modified transmission process. In practice, however, the invention is not limited to the combination of processes of this embodiment, and may be applied to combinations between the start transmission process and the exchange process, between the start transmission process and the modified transmission process, and between the exchange process and the modified transmission process, or to a single process.

According to the present invention, as described above, dynamic management of routing information can be effected without requiring an internetworking operation for routing information exchange, by using a general timer-charged circuit, such as an ISDN, and routing protocols including RIP protocols which conventionally require periodical updating. Thus, according to the invention, there may be provided a WAN which is particularly effective for communicating with less network traffic, entails reduced communication costs, and which facilitates network management.

What is claimed is:

1. A method for transferring path or routing information of a first internetworking equipment, which is connected to at least one alternative internetworking equipment by means of a circuit, and for communicating said path or routing information between computer networks respectively coupled to said first internetworking equipment and said alternative internetworking equipment, said method comprising:

an exchange process for exchanging said path or routing information with said alternative internetworking equipment in response to a request for transmission of said path or routing information, said path or routing information being transmitted also when data other than said path or routing information is transmitted.

2. A method for transferring path or routing information of a first internetworking equipment, which is connected to at least one alternative internetworking equipment by means of a circuit, and for communicating said path or routing information between computer networks respectively coupled to said first internetworking equipment and said alternative internetworking equipment, wherein said routing information comprises a plurality of pieces and said method comprises:

a start transmission process for transmitting all of said pieces of said path or routing information to said alternative internetworking equipment in a manner such that said circuit is internetworked in response to a request for a transmission of said path or routing information at a time of activation of said first internetworking equipment; and an exchange process for exchanging at least some of said pieces of said path or routing information with said alternative internetworking equipment in response to a request for transmission of said path or routing information, said path or routing information being transmitted also when data other than said path or routing information is transmitted.

3. A method according to claim 2, wherein said exchange process comprises transmitting to said alternative internetworking equipment only pieces of said path or routing information which have changed since a preceding path or routing information exchange.

4. A method according to claim 2, wherein said exchange process comprises transmitting all of said pieces of said path or routing information to said alternative internetworking equipment.

5. A method for transferring path or routing information of a first internetworking equipment, which is connected to at least one alternative internetworking equipment by means of a circuit, and for communicating said path or routing information between computer networks respectively coupled to said first internetworking equipment and said alternative internetworking equipment, said method comprising:

an exchange process for exchanging said path or routing information with said alternative internetworking equipment in response to a request for transmission of said path or routing information, said path or routing information being transmitted also when data other than said path or routing information is transmitted;

a modified transmission process for transmitting said path or routing information to said alternative internetworking equipment in a manner such that said circuit is internetworked in response to a request for the transmission of said path or routing information when said path information is changed.

6. A method for transferring path or routing information of a first internetworking equipment, which is connected to at least one alternative internetworking equipment by means of a circuit, and for communicating said path or routing information between computer networks respectively coupled to said first internetworking equipment and said alternative internetworking equipment, wherein said routing information comprises a plurality of pieces and said method comprises:

a start transmission process for transmitting all of said pieces of said path or routing information to said alternative internetworking equipment in a manner such that said circuit is internetworked in response to a request for a transmission of-said path or routing information at a time of activation of said first internetworking equipment; and a modified transmission process for transmitting at least some of said pieces of said path or routing information to said alternative internetworking equipment in a manner such that said circuit is internetworked in response to a request for the transmission of said path or routing information when said path or routing information is changed.

7. A method for transferring path or routing information of a first internetworking equipment, which is connected to at least one alternative internetworking equipment by means of circuit, and for communicating said path or routing information between computer networks respectively coupled to said first working equipment and said alternative internetworking equipment, said method comprising:

a start transmission process for transmitting said path or routing information to said alternative internetworking equipment in a manner such that said circuit is internetworked in response to a request for a transmission of said path or routing information at a time of activation of said first internetworking equipment;

an exchange process for exchanging said path or routing information with said alternative internetworking equipment in response to a request for transmission of said path or routing information, said path or routing information being transmitted also when data other than said path or routing information is transmitted; and a modified transmission process for transmitting said path or routing information to said alternative internetworking equipment in a manner such that said circuit is internetworked in response to a request for the transmission of said path or routing information when said path or routing information is changed.

8. A method according to any one of claims 1, 5 or 7, wherein said path or routing information comprises a plurality of pieces and said exchange process comprises transmitting to said alternative internetworking equipment only pieces of said path or routing information which have changed since a preceding path or routing information exchange.

9. A method according to any one of claims 5, 6 or 7, wherein said path or routing information comprises a plurality of pieces and said modified transmission process comprises transmitting to said alternative internetworking equipment only pieces of said path or routing information which have changed since a preceding path or routing information exchange.

10. A method according to any one of claims 1, 5 or 7, wherein said path or routing information comprises a plurality of pieces and said exchange process comprises transmitting all of said pieces of said path or routing information to said alternative internetworking equipment.

11. A method according to any one of claims 5, 6 or 7, wherein said path or routing information comprises a plurality of pieces and said modified transmission process comprises transmitting all of said pieces of said path or routing information to said alternative internetworking equipment.

12. A method according to claim 10, wherein:

said first internetworking equipment comprises a memory for storing path or routing information for an optimum path or routing between the respective computer networks, and said exchange process comprises learning changes in said path or routing information and transmitting to said alternative internetworking equipment all of said pieces of said path or routing information including information indicative of a disappearance of pieces of said path or routing information, if any, erased since a preceding path or routing information transmission.

13. A method according to claim 10, wherein:

said first internetworking equipment comprises a memory for storing path or routing information for an optimum path or routing between the respective computer networks, and said exchange process comprises learning changes in said path or routing information, erasing routing information previously learned from said alternative internetworking equipment as a partner of exchange, and holding path or routing information recently received from said alternative internetworking equipment.

14. A method according to claim 10, wherein:

said first internetworking equipment comprises a memory for storing path or routing information for an optimum path or routing between the respective computer networks, and said exchange process comprises transferring a signal indicative of an end of transmission between the first internetworking equipment and the alternative internetworking equipment, learning path or routing information when an exchange of said path or routing information with said alternative internetworking equipment is completed, and comparing said exchanged path or routing information with path or routing information previously learned, thereby detecting a disappearance of pieces of said path or routing information.

15. A method according to claim 11, wherein:

said first internetworking equipment comprises a memory for storing path or routing information for an optimum path or routing between the respective computer networks, and said modified transmission process comprises learning changes in said path or routing information and transmitting to said alternative internetworking equipment all of said pieces of said path or routing information including information indicative of a disappearance of pieces of said path or routing information, if any, erased since a preceding path or routing information transmission.

16. A method according to claim 11, wherein:

said first internetworking equipment comprises a memory for storing path or routing information for an optimum path or routing between the respective computer networks, and said modified transmission process comprises learning changes in said path or routing information, erasing routing information previously learned from said alternative internetworking equipment as a partner of exchange, and holding path or routing information recently received from said alternative internetworking equipment.

17. A method according to claim 11, wherein:

said first internetworking equipment comprises a memory for storing path or routing information for an optimum path or routing between the respective computer networks, and said modified transmission process comprises transferring a signal indicative of an end of transmission between the first internetworking equipment and the alternative internetworking equipment, learning path or routing information when an exchange of said path or routing information with said alternative internetworking equipment is completed, and comparing said exchanged path or routing information with path or routing information previously learned, thereby detecting a disappearance of pieces of said path or routing information.

18. A method according to any one of claims 2, 6 or 7, wherein:

said at least one alternative internetworking equipment comprises a plurality of pieces of internetworking equipment, and said start transmission process comprises making a connection to each of said plurality of pieces of internetworking equipment via the circuit when said first internetworking equipment is activated.

* * * * *